(12) United States Patent
Mayer et al.

(10) Patent No.: US 8,261,130 B2
(45) Date of Patent: Sep. 4, 2012

(54) PROGRAM CODE TRACE SIGNATURE

(75) Inventors: Albrecht Mayer, Diesenhofen (DE); Harry Siebert, Puchheim (DE)

(73) Assignee: Infineon Technologies AG, Neubiberg (DE)

( * ) Notice: Subject to any disclaimer, the term of this patent is extended or adjusted under 35 U.S.C. 154(b) by 997 days.

(21) Appl. No.: 11/681,472

(22) Filed: Mar. 2, 2007

(65) Prior Publication Data

US 2008/0215920 A1    Sep. 4, 2008

(51) Int. Cl.
*G06F 11/00* (2006.01)

(52) U.S. Cl. .......................... 714/45; 714/38.1

(58) Field of Classification Search ............... 714/27, 714/30, 38, 37, 45, 38.1, 38.12, 38.13; 717/124, 717/126, 128
See application file for complete search history.

(56) References Cited

U.S. PATENT DOCUMENTS

| 5,752,013 | A | * | 5/1998 | Christensen et al. | ......... 712/227 |
| 5,944,817 | A | * | 8/1999 | Hoyt et al. | ............. 712/240 |
| 6,279,113 | B1 | * | 8/2001 | Vaidya | ............................ 726/23 |
| 6,609,247 | B1 | * | 8/2003 | Dua et al. | ..................... 717/128 |
| 7,149,945 | B2 | * | 12/2006 | Brueggen | ..................... 714/758 |
| 7,472,262 | B2 | * | 12/2008 | Sun | ................................ 712/237 |
| 7,774,587 | B2 | * | 8/2010 | Kaabouch et al. | ................ 713/1 |
| 2002/0066080 | A1 | * | 5/2002 | O'Dowd | ........................ 717/128 |
| 2004/0015747 | A1 | | 1/2004 | Dwyer | |
| 2005/0015555 | A1 | * | 1/2005 | Wilkerson | ..................... 711/128 |
| 2008/0034350 | A1 | * | 2/2008 | Conti | ............................ 717/124 |

FOREIGN PATENT DOCUMENTS

DE    19530095 A1    2/1997

OTHER PUBLICATIONS

Maurer, W. D., et al., "Hash Table Methods", Computing Surveys 7(1), (Mar. 1975), 5-19.

* cited by examiner

*Primary Examiner* — Dieu-Minh Le
(74) *Attorney, Agent, or Firm* — Schwegman Lundberg & Woessner, P.A.

(57) ABSTRACT

A processor generates a signature value indicating a sequence of executed instructions, and the signature value is compared to signature values calculated for two or more possible sequences of executed instructions to determine which instruction sequence was executed. The signature is generated via a signature generator during program execution, and is provided external to the processor via a signature message.

26 Claims, 4 Drawing Sheets

PROGRAM CODE TRACE SIGNATURE

FIELD OF THE INVENTION

The invention relates generally to computer software, and more specifically in one embodiment to use of a signature to enhance program code trace capability.

BACKGROUND

Computer software or program code typically comprises a set of instructions that a specific type of computer or computer processor understands, and that can be executed in the computer to perform some task. The processors in computers typically only understand a certain preconfigured set of instructions, known as an instruction set.

Some software is written in what is known as assembly language, low-level code, or machine language, as it comprises instructions that are directly understandable and executable by the processor. More complex software is typically written in a more advanced programming language such as Fortran, C, or Java, and converted from a source code listing written in a programming language to machine language instructions known as object code by a process known as compilation before it can be executed. Advanced programming languages are typically the preferred method of creating all but the simplest software, because such languages typically are easier for programmers to understand. Modem computer languages also provide built-in support for a variety of complex hardware and computer functions, so that relatively simple program language instructions can be used to control complex computer hardware and to perform complex tasks.

The software that is distributed to consumers is typically machine code that is the result of compilation, and is provided in executable form. But, software rarely works as planned or expected when first compiled and executed. The software author or authors typically go through a process known as debugging, in which software flaws or bugs are observed and their cause is found and corrected. Finding the cause of a software bug is a significant challenge in many programming tasks, and has resulted in a variety of debugging software available to programmers. Debugging tools commonly used include tools for examining the contents of memory and of a processor's stored data, as well as tools to proceed through a program step-by-step to observe the results of each step in the program, and are a useful tool in observing the operation of a program so that it can be compared to the expected result or so that unintended operations can be found.

DETAILED DESCRIPTION

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to define these example embodiments. The following detailed description does not, therefore, limit the scope of the invention, which is defined only by the appended claims.

One example embodiment of the invention comprises a processor that generates a signature value indicating a sequence of executed instructions. The signature value is used to determine which of a number of possible code segments were loaded into a particular region of memory during execution, such as where memory management techniques result in swapping program code into and out of memory during execution. The signature value is derived from the sequence of executed instructions such that it is very likely the signature is unique to a specific set of instructions, assuming the set of instructions is sufficiently large. The signature value is then compared to signature values calculated for two or more possible sequences of executed instructions to determine which instruction sequence was executed. The signature is in some embodiments generated via a signature generator during program execution, and is provided external to the processor via a signature message such as by using a trace memory or buffer and a tool scan port.

Figure 1:
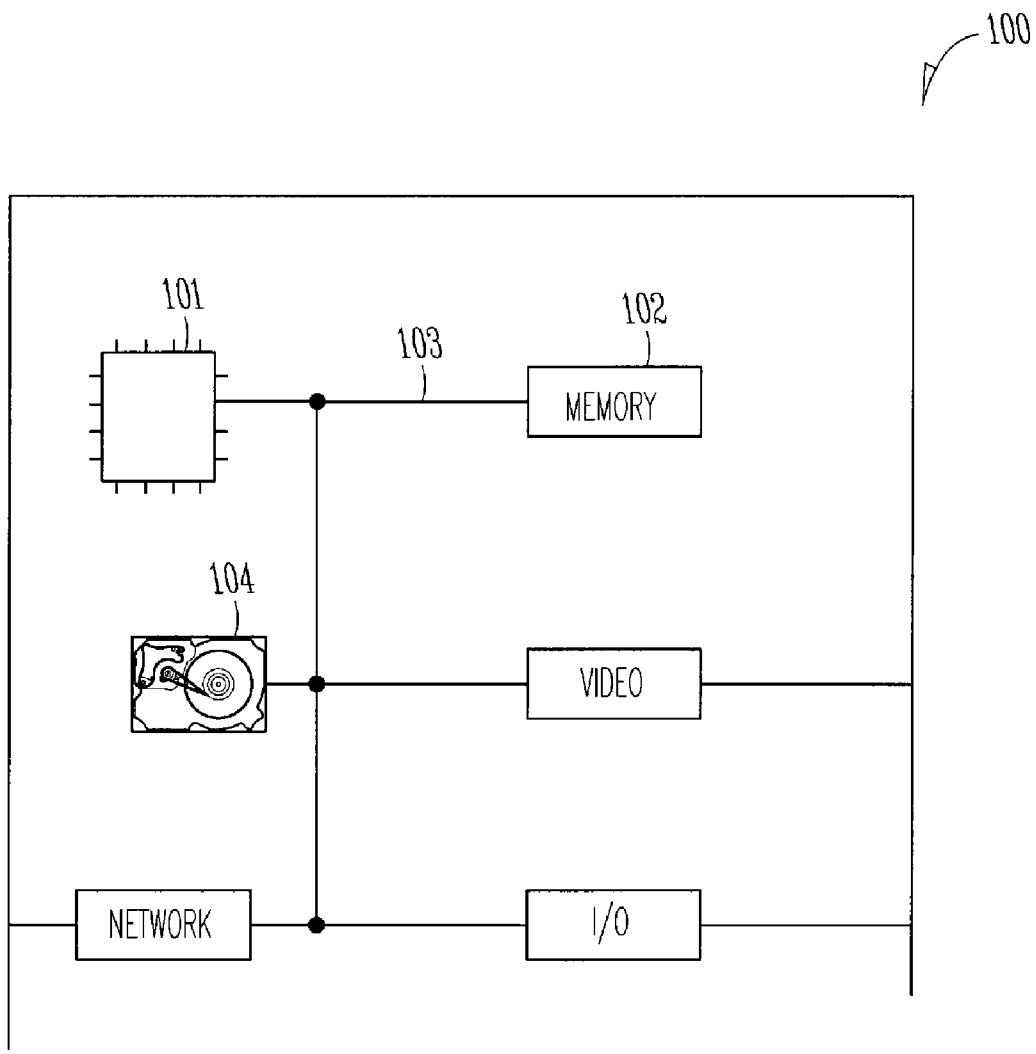
FIG. 1 illustrates a computerized system, such as may be used to practice various embodiments of the invention.

FIG. 1 is a block diagram of a computer system, as may be used to practice various embodiments of the invention. A computer system 100 is in some embodiments a general-purpose computer, such as the personal computer that has become a common tool in business and in homes. In other embodiments, the computer 100 is a special purpose computer system, such as an industrial process control computer, a car computer, a communication device, or a home entertainment device. The computer comprises a processor 101, which is operable to execute software instructions to perform various functions. The memory 102 and processor 101 in further embodiments include a smaller, faster cache memory which is used to store data that is recently used, or that is believed likely to be used in the near future. The software instructions and other data are stored in a memory 102 when the computer is in operation, and the memory is coupled to the processor by a bus 103. When the computer starts, data stored in nonvolatile storage such as a hard disk drive 104 or in other nonvolatile storage such as flash memory is loaded into the memory 102 for the processor's use.

In many general purpose computers, an operating system is loaded from the hard disk drive 104 into memory and is executed in the processor when the computer first starts, providing a computer user with an interface to the computer so that other programs can be run and other tasks performed. The operating system and other executing software are typically stored in nonvolatile storage when the computer is turned off, but are loaded into memory before the program instructions can be executed. Because memory 102 is significantly more expensive than most practical forms of nonvolatile storage, the hard disk drive or other nonvolatile storage in a computerized system often stores much more program data than can be loaded into the memory 102 at any given time. The result is that only some of the program data stored in nonvolatile memory for an executing program, operating system, or for other programs stored in nonvolatile memory can be loaded into memory at any one time. This often results in swapping pieces of program code into and out of memory 102 from the nonvolatile storage 104 during program execution, to make efficient use of the limited memory that is available.

Many modern computer systems use methods such as virtual memory addresses that are mapped to physical memory addresses and paged memory to manage the limited available physical memory 102. Virtual memory allows use of a larger number of memory address locations than are actually available in a physical memory 102, and relies on a memory management method to map virtual addresses to physical memory addresses as well as to ensure that the needed data is loaded into the physical memory. Needed data is swapped into and out of physical memory as needed by loading memory in pages, which are simply large segments of addressable memory that are moved together as a group. Memory management units within the processor or chipset architecture can also change the contents of memory or cache during program execution, such as where new data is needed in memory or is predicted to be needed and the memory or cache is already full.

An executing program may complete execution of all the needed program instructions in a particular page loaded into memory, and proceed to execute more instructions stored in another page. In a typical example, the previously executing page is swapped out of memory and the page containing the newly needed program code is loaded into memory in its place, enabling the processor to continue to execute program instructions from memory. This not only complicates memory management, but complicates debugging executing software as the program code stored in any particular physical memory location might be from any number of different pages with different virtual addresses. Further, program code loaded into memory need not be stored in the same physical memory location every time, and the actual physical address into which a program instruction is stored is not necessarily unique.

Figure 2:
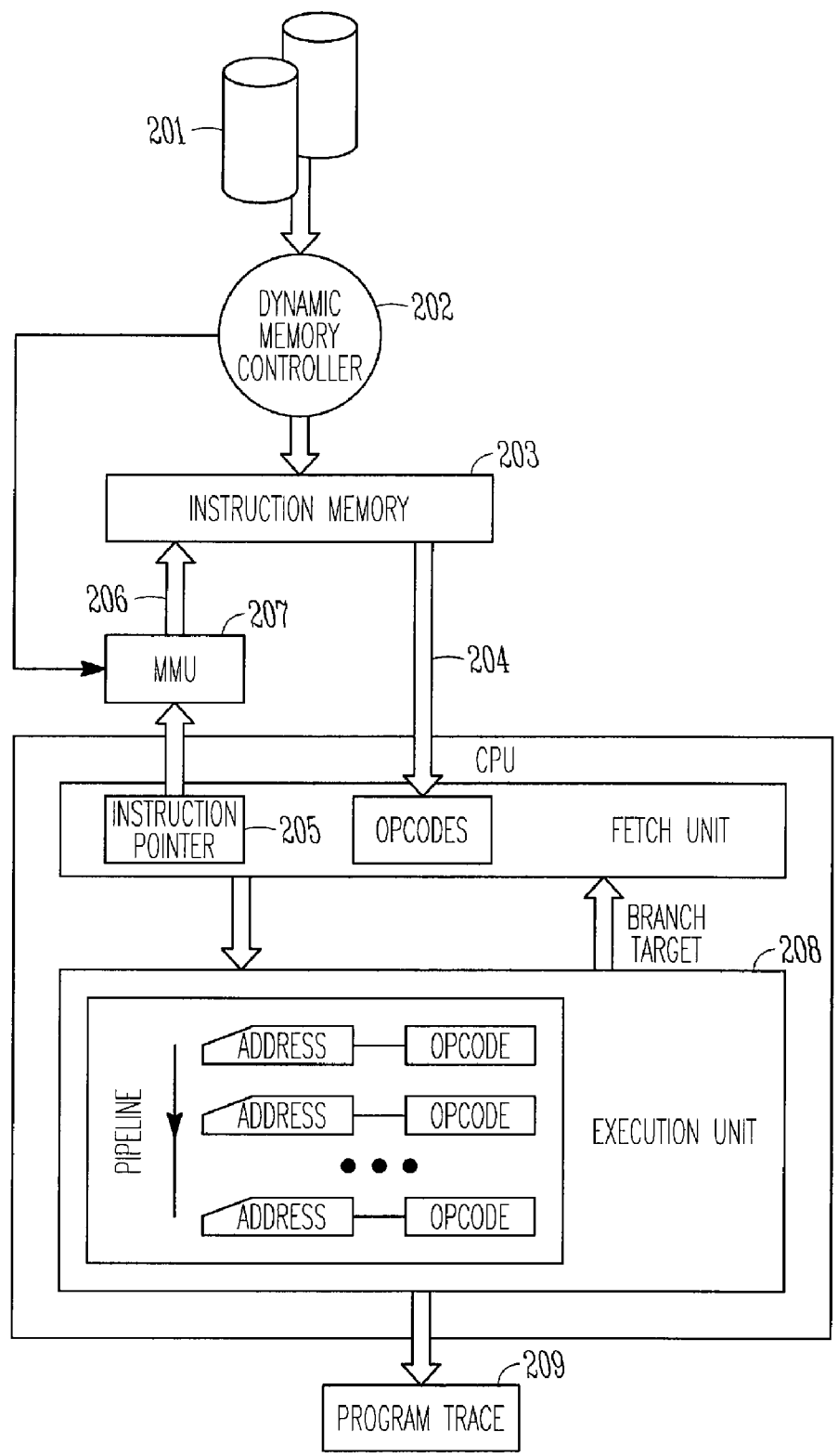
FIG. 2 is a block diagram of a computer system, as may be used to practice some embodiments of the invention.

When tracing a program in the debugging process, the instruction flow is typically recorded by recording the virtual addresses of the executed instructions. An example computer system block diagram is shown in FIG. 2, as may be used to practice some embodiments of the invention. Program code and other data is stored in storage 201, and are not directly associated with specific locations in system memory. The program code is loaded as needed by dynamic memory controller 202, which in various embodiments is an operating system task, a hardware memory controller, or another memory controller. Instructions are loaded as needed into instruction memory 203, which is in various embodiments any volatile or nonvolatile memory that is directly addressable by the processor. The instructions are provided to the processor for execution as shown at 204, and an instruction pointer referencing the currently executed program opcode is incremented at 205. If a branch or jump instruction is executed, the instruction pointer is not simply incremented but is changed to reflect the address of the branch or jump destination instruction. The instruction pointer address data is used to fetch the next instruction from memory as shown at 206, using physical or virtual addressing in various embodiments.

When using physical addresses, the memory management unit 207 need not be present, and the physical address referenced in the instruction pointer can be directly used to retrieve the next instruction from memory. When using virtual addressing, the MMU shown at 207 includes lookup tables built in communication with the dynamic memory controller 202 to convert the virtual address into a physical address. If the virtually addressed data is not physically stored in memory 203, it is loaded into physical memory and its physical memory location is associated with its virtual address in a process known as virtual memory management.

In examples where the instruction pointer uses physical addresses, the execution unit 208 passes physical addresses for the executed instructions to a program trace module 209. When virtual addresses are used, the program trace unit receives the virtual address data. In either case, it can be difficult to later determine which program instructions from storage 201 were present in the virtual or physical address locations recorded, such as when a program has completed execution or has reached a breakpoint in the debugging process.

Breakpoints are often used to interrupt program execution at a predetermined point, at which the state of various data can be observed to determine what has happened up to that point in the program. Breakpoints are sometimes set by including them in the high-level language program, and are sometimes implemented as a comparator that looks for a specific instruction at a specific address that stops execution as a result of an address match. But, because the address is not necessarily unique to a particular program instruction, false breaks in program execution can occur before the desired breakpoint is reached when using such methods. Further, breaks in execution of a program at random, unintentional locations may have little consequence when debugging a word processing program, but may destroy an engine or an industrial plant if the program is an engine control computer or an industrial process control computer. Real time systems therefore sometimes require more robust trace and debugging solutions than previous software applications.

Simply detecting false address matches can be performed by halting program execution and comparing the program content from memory to the various pages or memory contents that might possibly be located in that physical memory space. If the last instruction address's content matches the expected program code, the correct program code has been found and the system remains halted. If the contents of the last executed address do not match the expected program code, execution continues until the address matching the set breakpoint is again reached.

This solution is inconvenient if the program is relatively long, as several false program halts can occur before the desired breakpoint is reached. It remains problematic in applications where the program can't be stopped in certain points, such as in the engine control and industrial process control examples discussed earlier.

Another solution is to track loading various blocks of data into the memory, such as by tracing or recording the content of a specific marker location within the various pages or blocks that are swapped into and out of physical memory. This approach becomes impractical when relatively large numbers of pages are swapped in and out of memory, or when the size of data blocks swapped in and out of memory is relatively small. It is also problematic in that it requires additional logic and synchronization to track loading data into memory, particularly if the data is not loaded by the processor but is loaded by a direct memory access (DMA) controller or another such component.

One example embodiment of the invention seeks to remedy these and other problems by identifying the code actually executed during program execution. Although simply recording all instructions executed in order would reveal what code is actually executing, recording all executed instructions would require an undesirably large amount of storage space and is not a practical solution. The code is identified instead by use of a signature derived from the code, such as a hash value, a cyclic redundancy code (CRC), or an exclusive-or signature of the sequence of instructions that are actually executed. The length of the signature is selected to be sufficiently large that the odds of two different possible sequences of program instructions having the same signature is sufficiently low that it is not problematic.

In one such example, a register in a processor is set to a zero value before the first instruction in a sequence of code is executed, and each executed instruction is exlcusive-ORed with the value of the register. The resulting value of the register when program execution is halted is therefore very likely unique to the particular sequence of instructions that were executed, enabling the programmer to calculate the signature of various possible code sequences and compare the signatures of the possible code sequences to the signature stored in the register to confirm a specific sequence of instructions. The programmer can therefore confirm the instruction sequence executed up to the point at which the break occurred.

In a further embodiment, the signature calculation is restarted whenever a branch is taken, and the running value of the exclusive OR signature value is recorded in a trace file after a certain number of instructions have been executed, such as every 16 instructions. In other embodiments, the signature calculation is restarted on jump or branch instructions, such that the signature reflects the code sequence since the last jump or branch. In another example, crossing an address boundary triggers a restart in signature calculation, such that when the executed program code address changes from one block or page of memory to another, the signature counting restarts.

In another embodiment, the signature is not calculated on the fly but can be calculated at any time, even after program halt. In one such example, the program instructions execute continuously, and a buffer holds the last four instructions executed. In a further embodiment, the buffer holds a compressed version of the last four instructions executed, such as an 8-bit value derived from each of the last four instructions executed. These instructions are made available to the programmer such as by storing them in a special trace hardware register or by making the instructions available externally so that they can be buffered outside the processor. The signature identifying the program code then comprises the last four instructions executed, or some value derived from the last four instructions such as a signature value derived from exclusive ORing the last four instructions or their 8-bit derived values together. This signature can then be compared with the signatures of the possible code sequences that may have been stored in the memory and executed just before program halt.

In a further example, the processor that executes the software instructions includes special test functions accessible via a tool scan port, such as a Joint Test Action Group, or JTAG, port. This technology is described in IEEE standard 1149-1, which describes an system that provides access to a circuit via a test interface for purposes of debugging and testing. The technology is sometimes referred to as a boundary scan system, as access to scan internal functions and elements of the processor circuit is provided from the outside, or boundary, of the processor. During normal operation, the JTAG boundary scan features of the processor are not used, but special pins of the circuit are used or select pins are reassigned to provide special access to internal circuits for test purposes when the processor is under test or is being debugged.

The back door provided by the JTAG boundary scan interface allows an external controller to read the status of various registers and memory locations within the processor, as well as to change the state of various registers or memory locations and control the flow of program execution so that data values can be changed before execution of various program instructions and the results of individual program instructions can be observed. A tester or debugger can thereby set up a particular test condition in a circuit or processor and observe the result on a step-by-step basis, greatly aiding the debugging process for both software and hardware bugs or defects.

JTAG boundary scan ports are particularly common in embedded processor system such as controllers or car computers where the computerized system is designed for a specific purpose and is integrated into the product it controls. In a more detailed example embodiment of the invention, an automotive computer processor includes a JTAG boundary scan port operable to read a signature value of software instructions that have been executed, such as reading a signature of the last four instructions or reading a signature produced by exclusive-ORing the instructions executed since the last jump or branch instruction. Other examples of such systems include video game systems, medical devices, home appliances, and other computerized systems that don't typically execute a variety of customer-supplied software.

Figure 3:
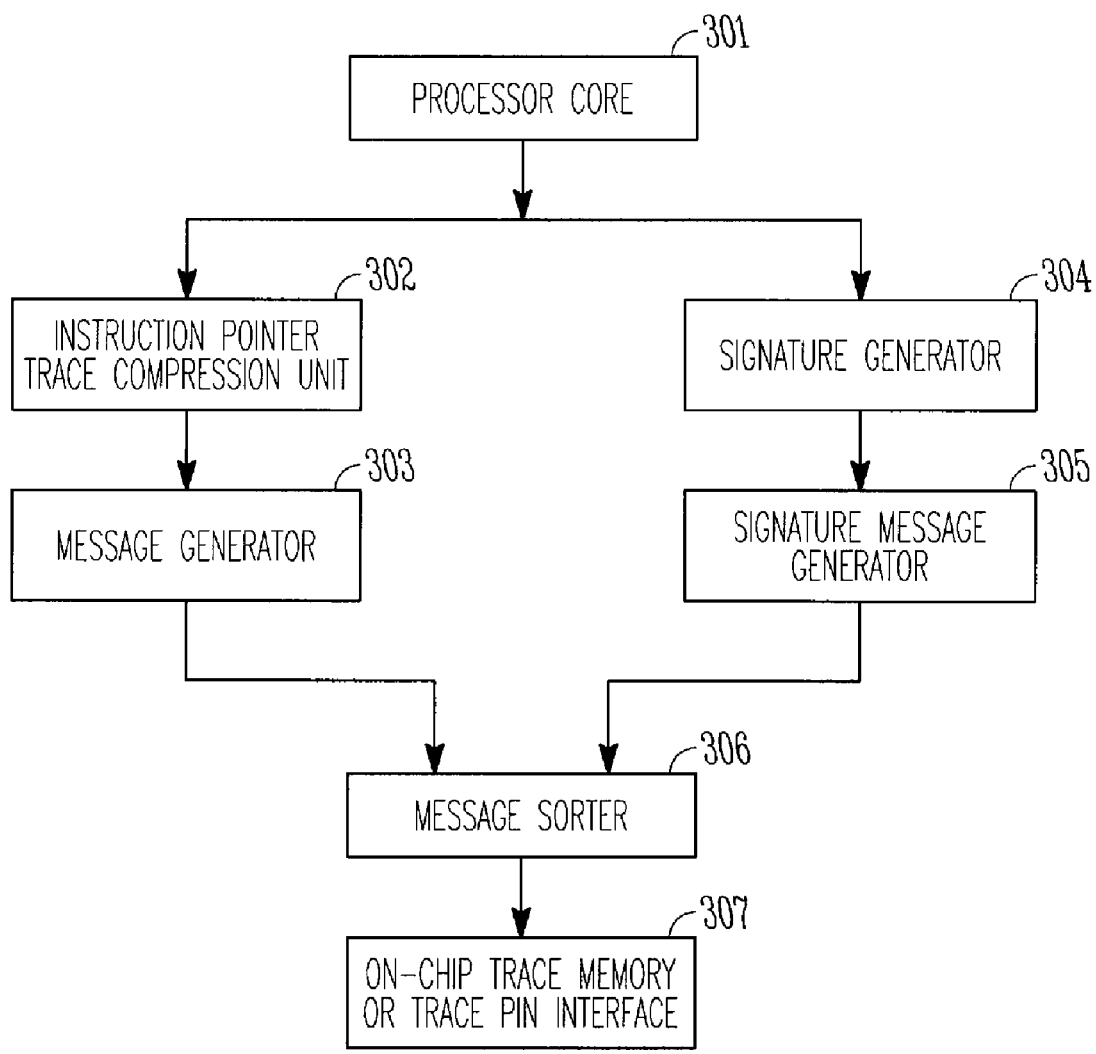
FIG. 3 is a block diagram of a processor comprising a signature generator and an instruction pointer trace unit, consistent with an example embodiment of the invention.

FIG. 3 is a block diagram of a processor architecture supporting program trace functionality including executed program code signatures, consistent with an example embodiment of the invention. A processor core 301 is operable to execute software instructions, such as are retrieved from memory 102 of FIG. 1 or from cache memory. The presently executing instruction is referenced by an instruction pointer or a program counter, which indicates the address of the currently pending instruction and is incremented as instructions are executed. The instruction pointer is also changed to reflect branch or jump points in the instruction flow.

The instruction pointer's indicated address is traced and compressed for storage as part of a program trace record at 302, and the instruction pointer information is formed into a message via a message generator 303. The messages contain the instruction pointer information compressed at 302, and are eventually stored in a log that can be examined after program execution to determine which instructions have executed during the program execution. Compression of the instruction flow is often very beneficial, as the volume of instructions executed can be much larger than the memory available for storing trace information. In one example, instruction pointer messages are compressed by identifying starting instruction addresses and the addresses of the instructions taken at branches or jumps, but not necessarily every intermediate instruction if no branches or jumps are present in the code. In another example, the trace messages are compressed by compressing the address values of the instructions.

A signature generator 304 receives the processor instructions being executed and generates a signature, such as by starting with a zero value and exclusive-ORing the executed instructions to a running signature value. In other embodiments, the signature is derived from a portion of the executing instruction, such as the last eight bits of each instruction, or comprises some other signature calculation method. A variety of hash functions, error correction and checksum functions, and other mathematical or logical functions will be suitable for signature generation, and will allow a debugger to determine which instructions have been executed. The signature data is sent to a signature message generator 305, which takes the signature data from the signature generator logic 304 and periodically formats it into a message that is suitable for storage as part of a program execution trace record. The signature message generator in some embodiments generates a message periodically, such as every 16 instructions, or uses other message generation criteria in other embodiments to trigger generation of a message. In a further embodiment, the signature message generator waits for a specified number of instructions before creating a first signature message, so that the signature value is very likely unique.

Both the signature messages from the signature message generator 305 and the instruction pointer trace unit messages from message generator 303 are forwarded to the message sorter 306, which organizes the message in a standardized readable format. Once the messages are sorted and organized, they are stored in the on-chip trace memory at 307, or are exported via a trace pin interface for storage external to the processor. The stored messages therefore contain instruction address data as well as signature data, so that the addresses of executed instructions can be seen via the instruction address messages and the actual instruction flow can be confirmed via the signature message data.

In an alternate embodiment, the signature generator 304 further includes additional data, such as a separate signature indicating the cache line from which the current instructions are executed. This signature in some embodiments is formed via a similar method such as a hash value calculation or exclusive OR logical function, or in alternate embodiments is formed using other methods such as by using an error correction code word (ECC) of the cache line, and is the result of the cache line from which executing instructions have been retrieved. The signature stays the same as long as execution continues from within the same cache line, but changes when a new cache line is used. The cache line signature in further embodiments is reset periodically, such as at jumps or braches in program flow, similar to the processor instruction signature example presented earlier.

Figure 4:
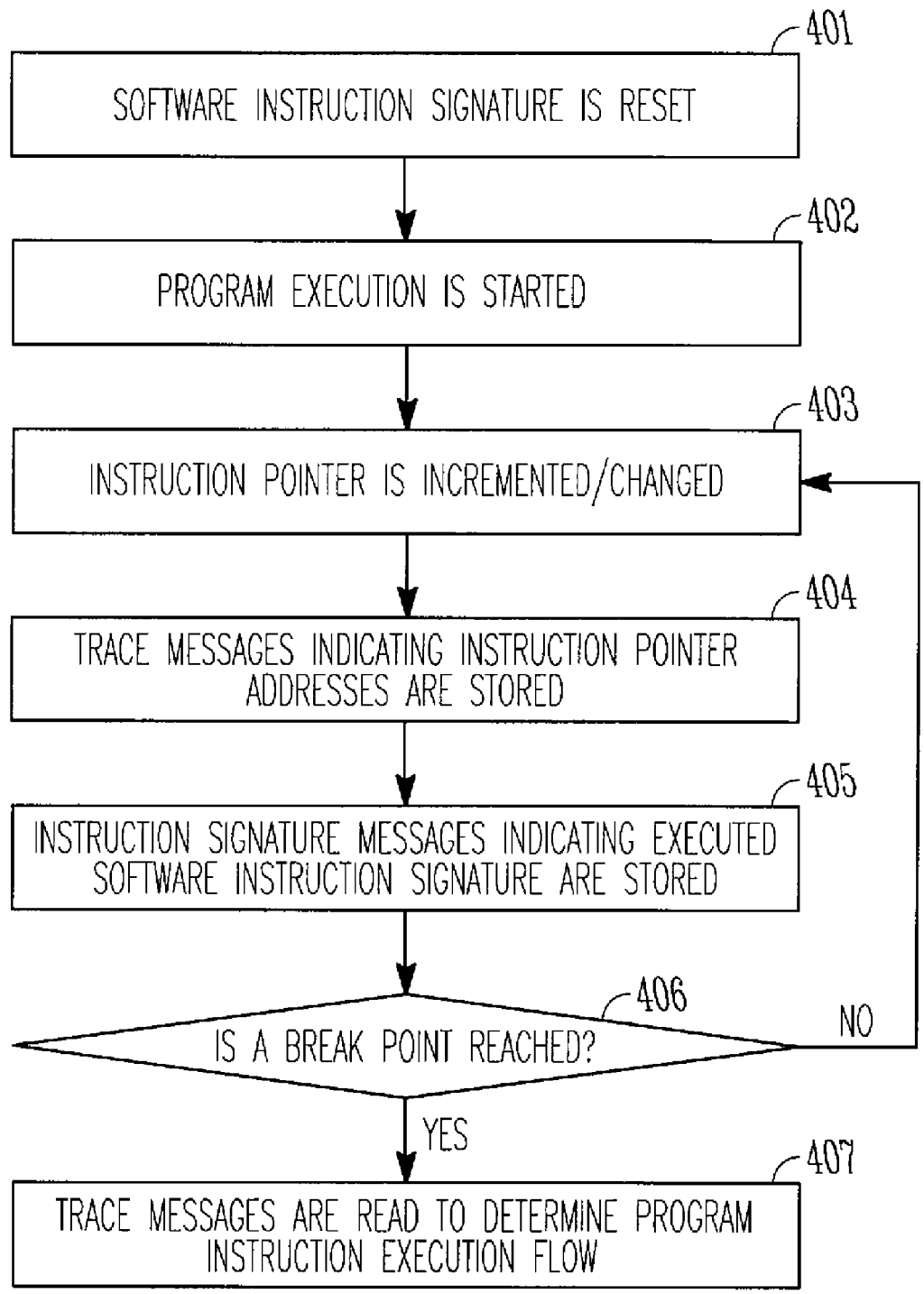
FIG. 4 is a flowchart of a method of using an executed software instruction signature to determine which of two or more instruction sequences were executed, consistent with an example embodiment of the invention.

FIG. 4 is a flowchart of one such example method of using an executed program code signature to identify the executed code from a limited number of possible code sections. At 401, the trace memory 307 on the processor is empty, and the processor loads and executes software instructions at 402. In some embodiments this software includes an operating system that provides an interface to execute and manage other software, while in other embodiments the software is simply a single program that executes from memory. In either example, the currently executing instruction is identified by the processor through a program counter or an instruction pointer at 403, which references the memory address of the instruction. This enables the processor to execute the instructions in order, and to perform jumps and branches to other addresses and to track the current point in the program by incrementing or changing the instruction pointer.

The addresses from the instruction pointer are provided during execution to the instruction pointer trace compression unit 302, and are periodically compiled into messages by message generator 303 as shown at 404. At the same time, the actual instructions being executed are used in the signature generator 304 to calculate a running signature value for the instruction sequence. When the instruction sequence is not sequential, such as through a jump or branch instruction, the signature generator resets and begins calculating the instruction signature anew. The instruction signature is periodically used to form a message in signature message generator 305, such as after a certain number of instructions.

The signature message and the instruction pointer messages are formed periodically throughout program execution, and are compiled and sorted as they are received in the message sorter 306 for storage in the on-chip trace memory 307 as the software executes as shown at 405.

When a break point is reached at 406, program instruction execution is halted and the data in the trace register is observed at 407. In other examples, the trace is stopped for reasons other than a break point, and the data in the trace register is observed. The data in the trace register in some examples is directly readable using various features of the processor or other hardware, such as by using a JTAG port to access the trace register in the processor while the processor is idle after the break point has been reached. The programmer is able to follow the sequence of instructions executed by observing the program addresses recorded in the instruction pointer trace messages, and the actual program data in the memory locations indicated can be confirmed via the program instruction signature messages. The program code signature data therefore enables the programmer to confirm that certain code was stored in certain memory addresses at various points in program execution, making the debugging process more certain.

The embodiment illustrated in FIG. 4 therefore provides a method of tracing program code executed in a processor, where a generated signature value indicating a sequence of executed instructions is compared to signature values calculated for two or more possible sequences of executed instructions to determine which instruction sequence was executed. The example embodiments of the invention described here illustrate how using a signature based on software instructions executed in a processor can help a programmer debug a software program by allowing him to verify which block of program code was in memory during execution. The signature generated from the executed program instructions can be easily compared to signatures generated from the possible code segments that may have been loaded in memory at the time of execution, such that a matching the signature of the executed code to a signature calculated from a code segment is a very strong indicator that the particular matching code segment having a matching signature was being executed when the signature was recorded.

In some embodiments, this signature generation and comparison function is performed by a software trace or debugging tool provided to the programmer, such that the trace messages including the signature messages are not necessarily directly observed by the programmer. Similarly, the signature of the executed program code may in some embodiments not be directly used by the programmer, but may be used within a debugging or trace tool to indicate which instructions have been executed. A significant use for making the signature available to a debug or trace tool is using a signature such as might be calculated on-chip and provided to the tool during execution to enable, disable, or create a break point in real-time. This enables the tool to ensure that the desired code is operating before a break, reducing the chances that a break will occur at undesired points in program execution. In another example, the on-chip breakpoint logic makes use of the signature to perform similar breakpoint management functions, such as enabling, disabling, or creating a breakpoint.

Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodi-

The invention claimed is:

1. A method of tracing program code executed in a processor, comprising:
    generating a signature value indicating a sequence of instructions that have already been executed on the processor, the signature value derived from the executed instructions; and
    comparing the signature value to signature values calculated for two or more possible sequences of executed instructions to determine which instruction sequence was executed.

2. The method of claim 1, further comprising storing the signature values in a trace log.

3. The method of claim 2, wherein storing the signature value is triggered by at least one of a jump instruction, a break instruction, crossing a predetermined memory address boundary, or reaching a predetermined number of executed instructions since the last signature value was stored.

4. The method of claim 1, further comprising storing instruction pointer address data messages indicating the addresses of a sequence of executed instructions.

5. The method of claim 4, wherein the instruction pointer address data messages are compressed.

6. The method of claim 4, wherein the instruction pointer address data messages and the signature values are recorded in the same trace log.

7. The method of claim 1, wherein the signature value is used during program execution to create, enable, or disable a break point.

8. A processor integrated circuit, comprising:
    a processor core;
    an instruction pointer trace unit;
    an executed instruction signature unit operable to generate signature messages comprising a signature calculated from previously executed instruction code; and
    a trace message storage unit.

9. The processor integrated circuit of claim 8, wherein the signature messages comprise at least one of an exclusive OR value derived from executed instructions, a checksum derived from executed instructions, a hash value derived from executed instructions, a value mathematically derived from executed instructions, or a value logically derived from executed instructions.

10. The processor integrated circuit of claim 8, wherein the signature messages are stored via the trace message storage unit.

11. The processor integrated circuit of claim 8, wherein the trace message storage unit is operable to store instruction pointer trace messages and executed instruction signature messages.

12. The processor integrated circuit of claim 11, wherein the trace message storage unit is operable to store messages in at least one of an on-chip or an off-chip trace memory.

13. The processor integrated circuit of claim 8, further comprising a break point trigger unit operable to perform at least one of enabling, disabling, or setting a break point based on a signature observed in the executed instruction signature unit.

14. The processor integrated circuit of claim 8, wherein the executed instruction signature unit is operable to generate a cache line content signature.

15. The processor integrated circuit of claim 14, wherein the cache line content signature comprises an error correction code of the cache line.

16. A method of matching a program code sequence to an instruction trace record; comprising:
    generating an executed program instruction signature derived from program instructions already executed on a processor;
    generating a program instruction signature for two or more different instruction sequences as a function of instruction code in such instruction sequences; and
    comparing the executed program instruction signature to the program instruction signatures for the two or more different instruction sequences to determine which of the two or more different instruction sequences was executed to generate the executed program instruction signature.

17. The method of claim 16, wherein generating an executed program instruction signature of executed program instructions comprises generating the executed program instruction signature during program execution.

18. The method of claim 16, wherein generating an executed program instruction signature of executed program instructions comprises at least one of an exclusive OR value derived from executed instructions, a checksum derived from executed instructions, a hash value derived from executed instructions, a value mathematically derived from executed instructions, or a value logically derived from executed instructions.

19. The method of claim 16, further comprising storing the signature value based on at least one of a jump instruction, a break instruction, crossing a predetermined memory address boundary, or reaching a predetermined number of executed instructions since the last signature value was stored.

20. The method of claim 16, further comprising generating a cache line content signature, and comparing the cache line content signature to two or more potential cache line data sets to determine which of the potential cache line data sets was stored in the cache line.

21. A processor integrated circuit, comprising:
    a tool access port;
    a signature message generator operable to generate a signature derived from a sequence of program instructions already executed on the processor, the signature value derived from the executed instructions, wherein the signature message is accessible external to the processor integrated circuit via the tool access port.

22. The processor integrated circuit of claim 21, further comprising a signature message buffer operable to store the signature message such that the buffer can be read.

23. The processor integrated circuit of claim 21, further comprising a trace memory operable to store at least one of program instruction address trace messages and signature messages, the trace memory accessible external to the processor.

24. A non-transitory machine-readable medium with instructions stored thereon, the instructions when executed operable to cause a computerized system to:
    read an executed instruction signature indicating a sequence of instructions already executed on a processor integrated circuit, the signature value derived from the executed instructions;
    derive signatures from at least two code software instruction sequences as a function of instruction code in such instruction sequences; and compare the executed instruction signature to the signatures derived from the at least two code sequences to determine which of the at least two code sequences comprise the sequence of executed instructions.

25. The non-transitory machine-readable medium of claim 24, wherein the executed instruction signature is read from a trace memory in the processor.

26. The non-transitory machine-readable medium of claim 24, wherein the executed instruction signature is read from the processor.

* * * * *